United States Patent [19]

Friedrich et al.

[11] 4,019,007
[45] Apr. 19, 1977

[54] GROUNDED-TANK HIGH-POWER COMPRESSED-GAS CIRCUIT-INTERRUPTER

[75] Inventors: Robert E. Friedrich, Upper St. Clair; Robert L. Hess, N. Versailles, both of Pa.

[73] Assignee: Westinghouse Electric Corporation, Pittsburgh, Pa.

[22] Filed: Sept. 25, 1975

[21] Appl. No.: 616,713

[52] U.S. Cl. .................. 200/148 B; 200/148 H
[51] Int. Cl.² .................................. H01H 33/82
[58] Field of Search ....... 200/148 B, 148 D, 148 R, 200/148 H

[56] References Cited

UNITED STATES PATENTS

| | | | |
|---|---|---|---|
| 2,459,600 | 1/1949 | Strom | 200/148 B |
| 3,356,809 | 12/1967 | Colclaser, Jr. et al. | 200/148 H |
| 3,725,623 | 4/1973 | Fischer et al. | 200/148 H |
| 3,946,184 | 3/1976 | Yoshioka et al. | 200/148 D |

Primary Examiner—Robert S. Macon
Attorney, Agent, or Firm—W. R. Crout

[57] ABSTRACT

An improved grounded-tank compressed-gas circuit-interrupter of the two-break rotatable contact-arm type is provided having an improved grounded metallic-tank configuration to accommodate interiorly therein one or more arc-extinguishing assemblages of the two-break rotating contact-arm variety.

In some embodiments of the invention, only a single rotatable contact-arm assemblage is provided, the axis of rotation being generally horizontal, and a vertically-extending generally cylindrical grounded metallic dead-tank housing being provided to accommodate interiorly therein the arc-extinguishing assemblage, with the line-terminal connections for the rotatable contact-arm assemblage extending generally laterally, horizontally to a pair of upstanding terminal-bushings, the latter being generally vertically disposed, and extending downwardly into off-jutting metallic tank portions interconnected with the main cylindrical tank housing.

9 Claims, 14 Drawing Figures

242 K.V. (FOR EXAMPLE)

550 K.V. (FOR EXAMPLE)

800 K.V. (FOR EXAMPLE)

362 K.V. (FOR EXAMPLE)

CLOSED POSITION

FULLY CLOSED POSITION

GROUNDED-TANK HIGH-POWER COMPRESSED-GAS CIRCUIT-INTERRUPTER

An important feature of the invention is the compactness and safety provided by the two vertically-extending terminal-bushing structures having the line-connections disposed at their lower ends extending generally horizontally laterally into the main cylindrical tank housing, where the line-connections are connected to the rotatable contact-arm circuit-interrupting assemblage. The latter may be of either a single type at one horizontal level, or, where desired, for the higher-voltage ratings, a two-level arrangement may be provided having the two rotatable contact-arm assemblages disposed vertically one above the other with the main cylindrical centrally-disposed tank housing, or casing being vertically extended to a greater vertical height to accommodate the second-level rotating contact-arm assemblage.

CROSS-REFERENCES TO RELATED APPLICATIONS

Applicants are not aware of any related patent applications pertinent to the present invention involving grounded dead-tank structures accommodating the rotatable arc-extinguishing assemblages of the instant invention.

SUMMARY OF THE INVENTION

In accordance with the present invention, a generally vertically-extending grounded metallic tank structure, or casing is provided for accommodating one or more vertically-spaced rotatable contact-arm extinguishing assemblages mounted upon a vertically-extending supporting tube structure. The supporting tube structure accommodates the vertically-extending operating rod and the vertically-extending high-pressure gas-tube connections.

For higher voltage ratings and increased power applications, a second rotatable contact-arm assemblage may be provided, including an upper tubular supporting tube, also accommodating the vertically-extending operating rod and the gas-tube connections. The line-terminal connections for the circuit-interrupting structure, whether of the one or two assemblage variety, may be extended laterally through off-jutting. Metallic cylindrical portions into off-center metallic terminal-bushing housings, the latter accommodating, in a generally vertical arrangement, upstanding terminal-bushings to carry the series line current out of the entire circuit-interrupting structure.

Preferably, the arc-extinguishing assemblages are of the rotating contact type, each involving two series breaks, as set forth in U.S. Pat. No. 3,457,530, issued July 22, 1969 to Roswell C. Van Sickle, and assigned to the assignee of the instant patent application.

DESCRIPTION OF THE PREFERRED EMBODIMENTS

Figure 11:
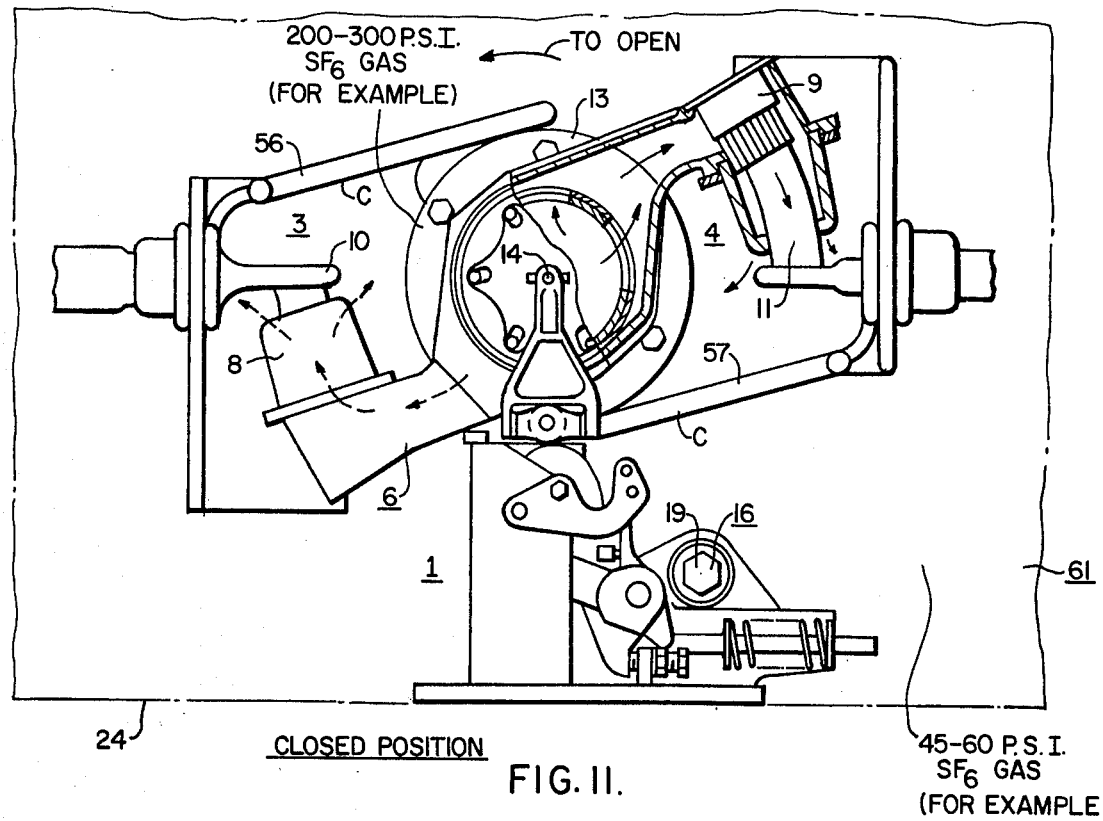
FIG. 11 is a considerably-enlarged view taken through one of the rotatable contact-arm assemblages, the separable contact structure being indicated in the closed-circuit position.
Figure 12:
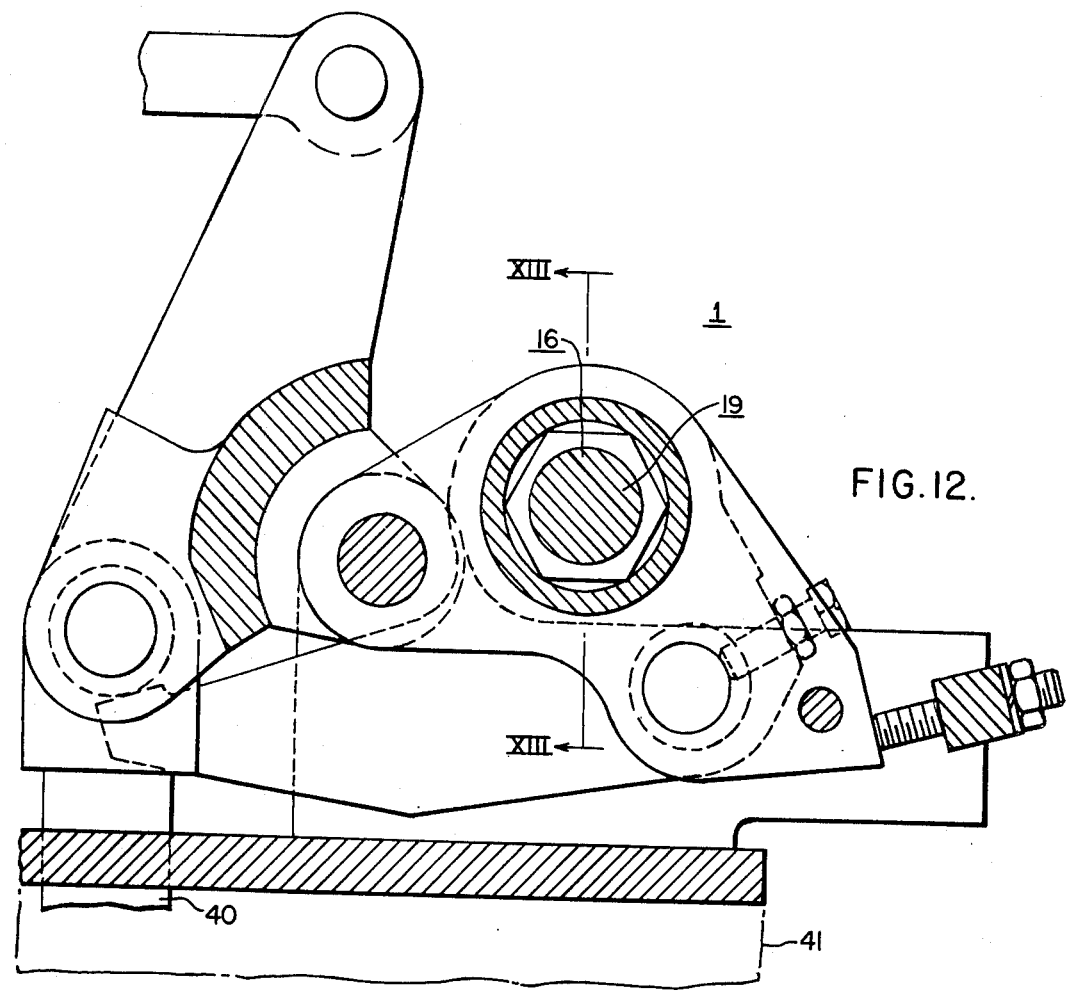
FIG. 12 is a detailed view of the operating crank-arm assemblage utilized within the interior of the circuit-interrupting assemblage illustrated in FIG. 11.
Figure 13:
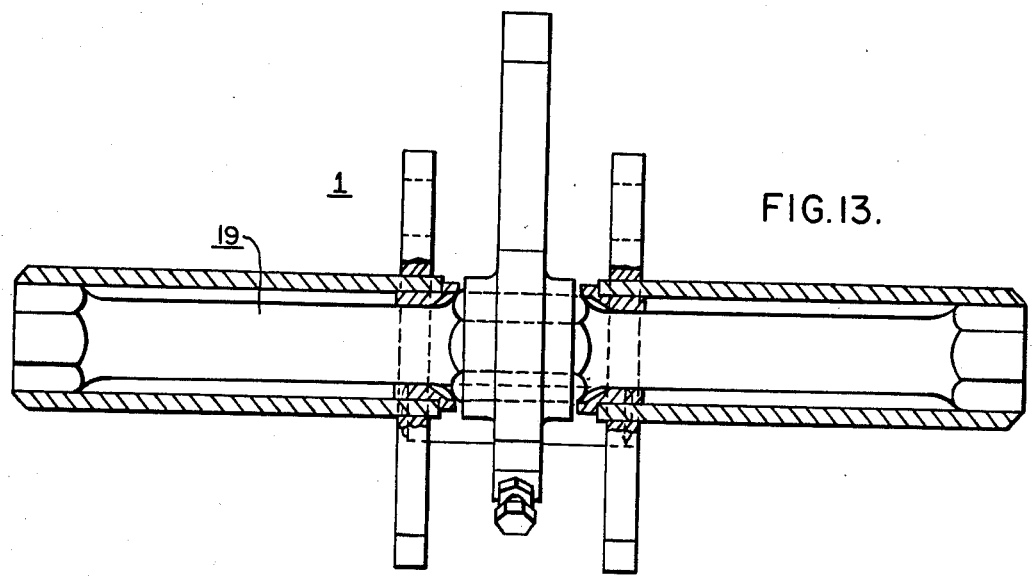
FIG. 13 is a view taken substantially along the line XIII—XIII of FIG. 12, indicating the accelerating compression-spring means and the accelerating torsion-bar construction; and, FIG. 14 diagrammatically represents the operating rod and gas-tube connections for a three-phase installation involving three of the tank structures illustrated in FIGS. 1–4 for operating the arc-extinguishing assemblages, and supplying the high-pressure gas connections thereto.

Referring to the drawings, and more particularly to FIGS. 11–13 thereof, it will be observed that there is provided a high-voltage compressed-gas circuit-interrupter assemblage 1 of the rotating contact-arm type, as set forth in U.S. Pat. No. 3,457,530, issued July 22, 1969 to R. C. Van Sickle, and assigned to the assignee of the instant application. Generally, the two-break contact construction 3, 4 of the high-voltage assemblage 1, as shown in FIGS. 11–13, shows the rotating movable contact-arm construction 6, in which a pair of serially-related movable contacts 8, 9 are separable from a pair of spaced relatively-stationary contacts 10, 11. During the opening operation, and as set forth in said U.S. Pat. No. 3,457,530, the two movable contacts 8, 9 separate from the two relatively-stationary contacts 10, 11, drawing two arcs in series, and establishing a gas-flow from a high-pressure gas-reservoir chamber 13, extending on the axis 14, of the movable contact assembly. Reference may again be made to said U.S. Pat. No. 3,457,530 for a detailed description.

It will be observed, with reference to FIG. 11, that in the closed-circuit position of the contact structure 3, 4 of FIG. 11 that the contacts 8, 9 are under considerable accelerating spring pressure tending to effect their opening motion. This is not only provided by a pair of "tail" springs 16, 17 (FIG. 14), associated with the ground-operating mechanism 18, but, importantly, a heavy torsion-bar 19, as set forth more clearly in FIG. 13, is provided to enable a tremendous accelerating "kickoff" spring action at the contact structure 3, 4 itself enabling a very fast initial opening operation to be achieved, which, subsequently, is carried out by the aforementioned "tail" springs 16, 17, disposed at the ends of the ground-operating rods 21, 22 at ground potential.

As set forth in FIGS. 1–4, the present invention is particularly concerned with a generally vertically-extending grounded metallic cylindrical tank structure 24 having off-setting, and outwardly-jutting metallic cylindrical portions 25, 26 interconnecting with terminal-bushing housings 27, 28 having supporting vertically therewithin terminal-bushing structures 29 and 30.

Figure 10:
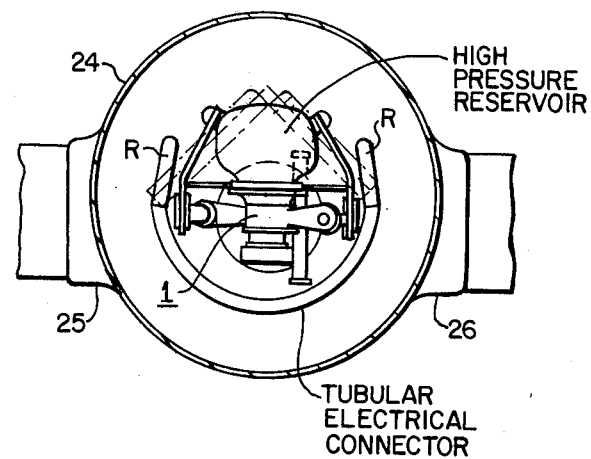
FIG. 10 is a fragmentary sectional view taken substantially along the line X—X of FIG. 9.
Figure 9:
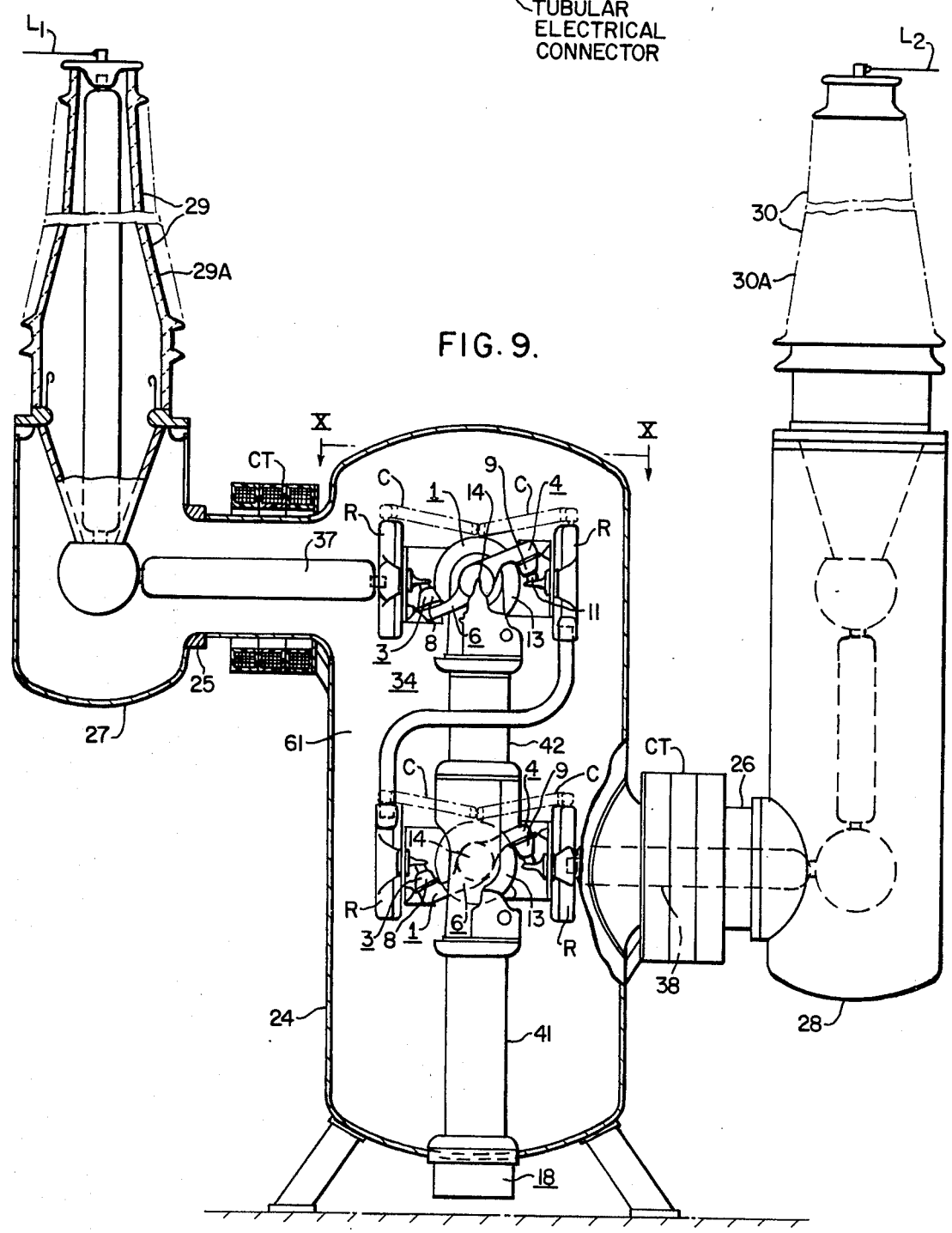
FIG. 9 is a vertical sectional view taken through the circuit-interrupting structure of FIG. 3 involving a two-layer arc-extinguishing assemblage arrangement.

Within the centrally-located generally-cylindrically-arranged metallic grounded tank structure 24 may be provided either a single rotatable contact-arm assemblage 1, as indicated in FIGS. 5–8, or, where desired, for the higher-power ratings, such as 550 kV or 800 kV, for example, a two-layer or two-level arc-extinguishing assemblage 34 involving a plurality of vertically-spaced rotatable contact-arm assemblages 1, as more clearly illustrated in FIGS. 9 and 10 of the drawings.

Whether a single rotatable contact-arm assemblage 1 is provided, as set forth in FIGS. 5 and 6, or 7 and 8, or whether a pair of serially-related arc-extinguishing assemblages 1, on a double level 34 are used, as indicated in FIGS. 9 and 10, it will be observed that compactness and safety are provided with a minimization of gas-volume required. In all of the disclosed arrangements, there is provided a generally vertically-extending metallic grounded cylindrical tank structure, or casing 24, which accommodates the one or more rotatable contact-arm assemblages 1, the axes 14 of which are generally horizontally arranged, as indicated, with the line-connections 37, 38 extending radially outwardly to the off-jutting cylindrical metallic portions 25, 26, the latter of which may accommodate current-transformers CT, as illustrated in FIGS. 9 and 10.

Figure 14:
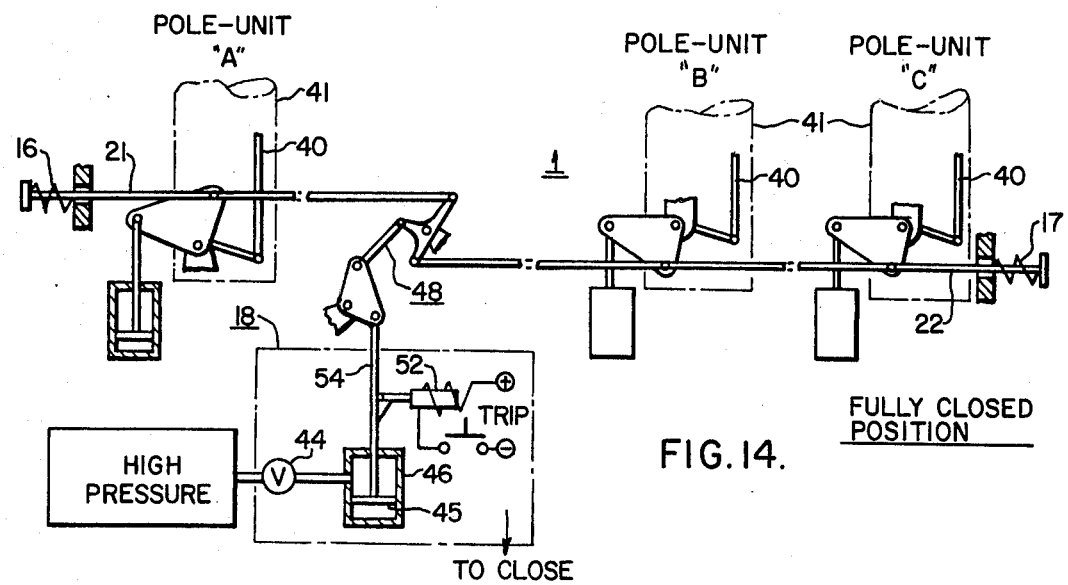

To effect the operation of the one or more rotatable contact-arm assemblages 6, vertically-extending insulating operating rods 40 may extend upwardly from a suitable lower-disposed operating mechanism 18, such as illustrated in FIG. 14. A single insulating operating rod 40 may extend upwardly within the lower tubular insulating support tube 41, and, if desired, may continue on upwardly, as illustrated at 42 in FIG. 9, to effect operation of the upper-level rotatable contact-arm assemblage 6. To effect closing of the circuit-interrupter, a suitable gas-valve 44 may be employed to effect downward closing movement of the operating piston 45 within the operating cylinder 46, as shown in FIG. 14. Through the connecting linkage 48, this will effect corresponding downward closing motion of each of the three insulating operating rods 40, which effect considerable charging spring pressure on the accelerating springs 16 and 17 together with the torsion-bar opening accelerating stress 19.

Figure 7:
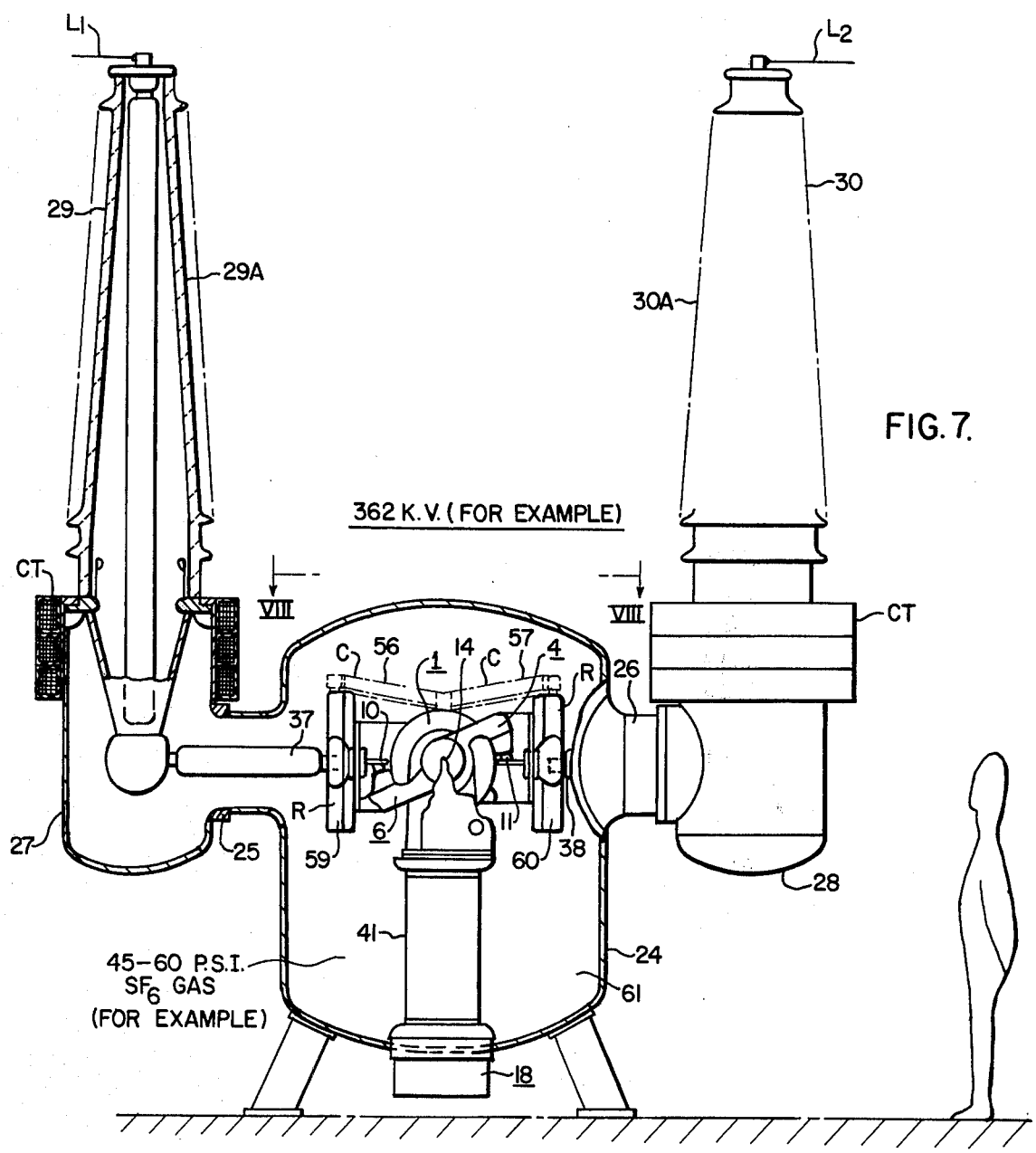
FIG. 7 is a vertical sectional view taken through the circuit-interrupting structure of FIG. 2 along the line VII—VII thereof.

Normally, in the closed-circuit position of the circuit-interrupter, as illustrated in FIGS. 7 and 9, the rotatable contact arms 6 are under considerable opening spring pressure tending to effect their counter-clockwise rotative opening motion. This will, of course, when released or unlatched, establish two serially-related arcs. This is effected, for example, by the tripping of an electrically-actuated strip-solenoid 52, as shown in FIG. 14, thereby unlatching the piston-rod 54, and thereby permitting the accelerating springs 16, 17 and the augmenting torsion-bar 19 to relax and effect opening of the contact structure 3, 4 under considerable opening spring pressure.

For the lower ratings, it will be apparent that there are provided two breaks 3, 4 (FIG. 11) in series with capacitances 56, 57 controlling the voltage thereacross, when desired, and also, where desired, closing resistances 59, 60 may be utilized and brought into circuit during the closing operation, as set forth in the aforesaid Van Sickle U.S. Pat. No. 3,457,530.

Figure 1:
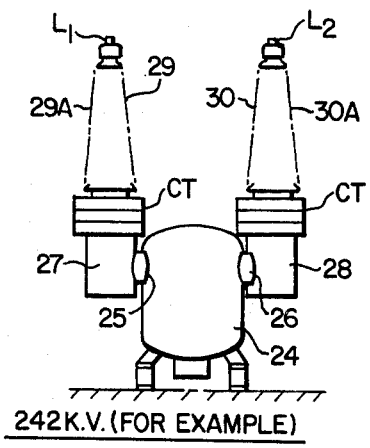
FIG. 1 is a side-elevational view of a compressed-gas-type circuit-interrupting assemblage incorporating the principles of the present invention.
Figure 3:
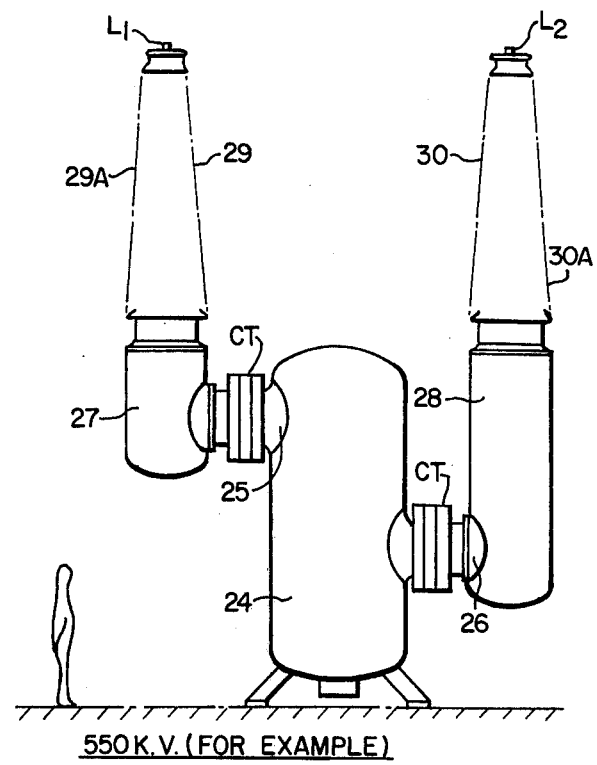
FIG. 3 illustrates still a further embodiment of the invention, involving a "two-layer" circuit-interrupting assemblage arrangement adaptable for the higher power ratings, say for example, 550 kV.
Figure 4:
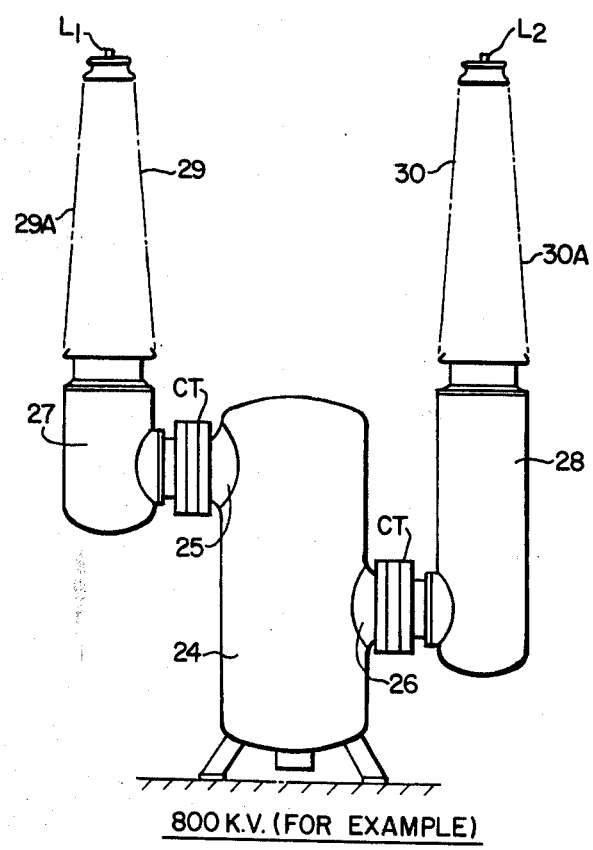
FIG. 4 involves a still higher power rating, such as 800 kV, for example, involving again a two-layer supporting arrangement for accommodating two serially-related rotatable contact-arm arc-extinguishing assemblages.
Figure 2:
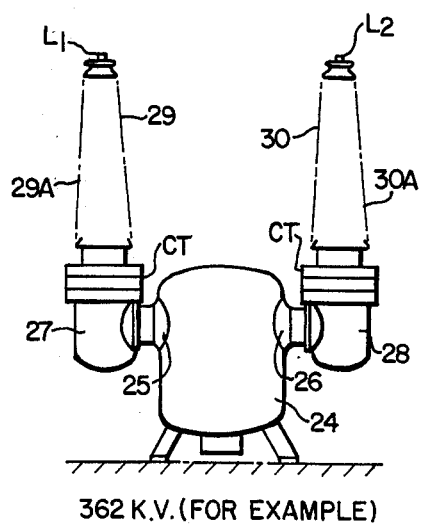
FIG. 2 is a view similar to that of FIG. 1, but adaptable for a higher-voltage rating, say 362 kV, for example.
Figure 6:
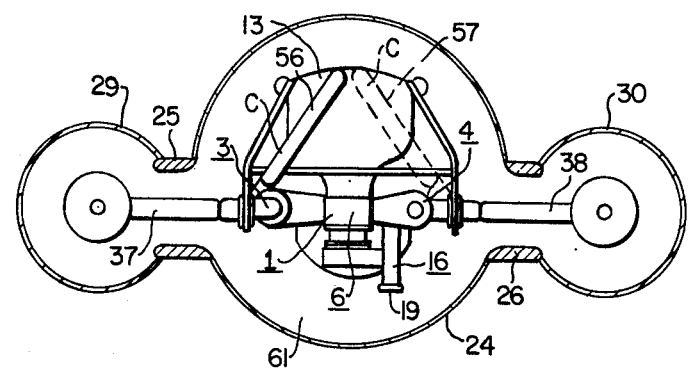
FIG. 6 is a horizontal sectional view taken substantially along the line VI—VI of FIG. 5.
Figure 5:
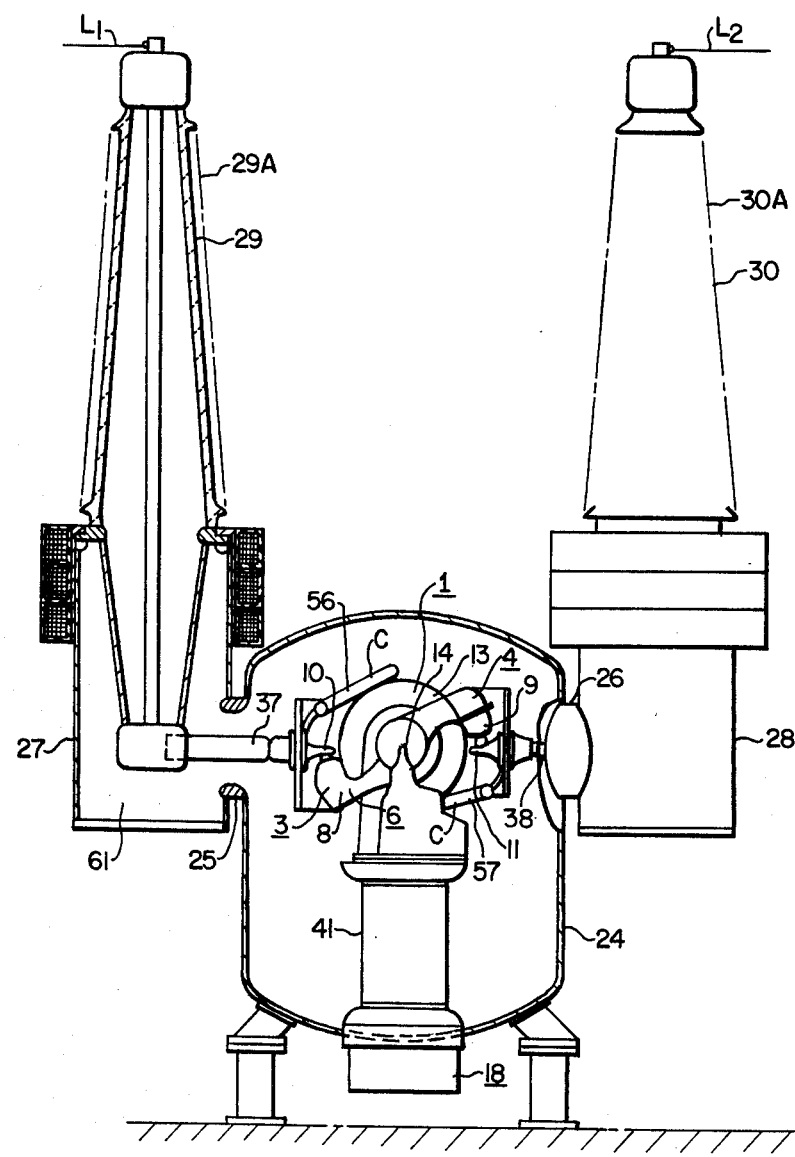
FIG. 5 is a vertical sectional view taken through the circuit-interrupting structure of FIG. 1 illustrating the generally rotatable contact-arm assemblage, the contact structure being illustrated in the closed-circuit position.
Figure 8:
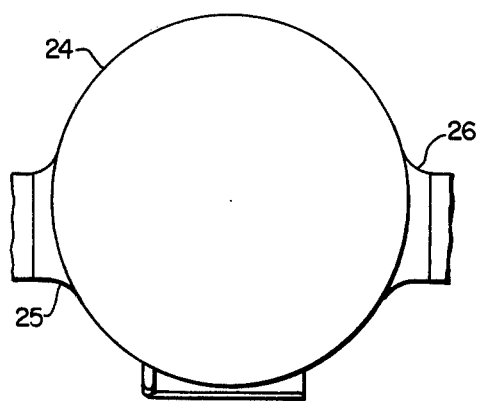
FIG. 8 is a fragmentary horizontal sectional view taken substantially along the line VIII—VIII of FIG. 7.

The current-transformers CT may be disposed about the terminal-bushing housings 27, 28, as illustrated more clearly in FIGS. 5 and 7, or for the higher power ratings, as illustrated in FIGS. 3 and 4, and detailed more clearly in FIG. 9 of the drawings, the current-transformers CT may surround the off-jutting metallic cylindrical portions 25, 26 thereby encircling the line-connectors 37 and 38.

From the foregoing description, it will be apparent that there has been provided an improved high-voltage circuit-interrupting structure of the dead-tank or grounded-tank variety, particularly applicable for the higher power ratings, and involving the advantageous use of modules 1 disposed in generally vertical arrangement depending on the voltage and power requirements desired.

It will be observed that the use of the vertically-extending grounded cylindrical tank 24 minimizes the gas volume required, and provides a stable and sturdy safe tank arrangement resistant to earthquake applications, and extending the terminal-bushings 29, 30 high up in the air away from ground personnel. All of the enclosures including the metallic tank structures 24, 27 and 28, and the porcelain or epoxy upper casings 29A, 30A for the terminal-bushings 29, 30 are, of course, innocuous to ground personnel, leaving only the upper line-terminal connections $L_1$, $L_2$ at high voltage. Since these are located well up in the air, they present no problem or hazard.

The gas pressure within the cylindrical metallic tank housing 24 may be, for example, 45 to 60 p.s.i.g., and the internal high-pressure gas utilized within the high-pressure reservoirs 13 may be, for example, 260 to 300 p.s.i.g. A suitable highly-insulating and good arc-extinguishing gas 61 may be used, say, for example, sulfur-hexafluoride ($SF_6$) gas. Other gases, of similar dielectric and interrupting characteristics, or even compressed air could, of course, be utilized instead of sulfur-hexafluoride ($SF_6$) gas.

Although there have been illustrated and described specific structures, it is to be clearly understood that the same were merely for the purposes of illustration, and that changes and modifications may readily be made therein by those skilled in the art, without departing from the spirit and scope of the invention.

What is claimed is:

1. A high-voltage, high-power compressed-gas circuit-interrupter including a vertically-extending generally-cylindrical grounded metallic tank (24), a two-break rotatable-contact-arm type of arc-extinguishing assembly having its axis of rotation generally horizontally arranged and disposed within said vertically-extending grounded metallic tank structure, a pair of off-jutting metallic terminal-bushing housings, a pair of laterally-spaced vertically-extending terminal-bushings extending upwardly one from each of said metallic terminal-bushing housings so that the line-connections assume a generally U-shaped arrangement, an insulating stationary tubular support (41), extending downwardly from said two-break rotatable-contact-arm type of arc-extinguishing assemblage to the bottom of said cylindrical vertically-extending metallic tank structure, an operating rod extending upwardly through said tubular insulating support, a high-pressure gas-reservoir chamber disposed generally upon the axis of said arc-extinguishing assemblage, gas conduit means extending through the hollow rotatable arms of said arc-extinguishing assemblage, whereby gas may flow generally horizontally along the axis of said assemblage and radially outwardly through the two hollow rotatable arms of said rotatable assemblage, and a high-pressure gas-conduit extending up through said vertically-extending tubular stationary insulating support (41) to said high-pressure gas-reservoir chamber.

2. The combination according to claim 1, wherein current-transformer means encircles a portion of the terminal-bushing housing for measuring current flowing through the circuit-interrupter.

3. The combination according to claim 1, wherein outwardly-extending off-jutting cylindrical metallic casings are interposed between the main metallic cylindrical tank and the current-transformer metallic housings, and current-transformer means are provided encircling at least one of said off-jutting metallic casings.

4. The combination according to claim 1, wherein a second-level rotatable arc-extinguishing assemblage of similar two-break rotatable-contact-arm type if additionally provided being connected serially into the electrical circuit with the first said two-break-rotatable contact-arm type of arc-extinguishing assemblage.

5. A high-power compressed-gas type of circuit-interrupter comprising, in combination, a laterally-spaced pair of terminal-bushings having spaced line connections disposed at the upper ends thereof and spaced line conductors (37, 38) disposed adjacent the lower ends thereof, a grounded metallic tank structure enclosing the lower ends of said terminal-bushings and including a pair of terminal-bushing metallic casings spaced laterally apart, a generally-upstanding cylindrical grounded metallic tank casing interposed centrally between said two laterally-spaced current-transformer metallic housings, a two-break rotatable-contact-arm type of arc-extinguishing assemblage disposed within said centrally-disposed interposed main metallic tank structure and electrically connected to said spaced line-connections (37, 38), the axis of rotation of said rotatable contact-arm type of arc-extinguishing assemblage being generally horizontal, upstanding insulating means for supporting said rotatable-contact-arm type of arc-extinguishing assemblage above the bottom of the centrally-disposed grounded metallic tank structure, and high-pressure gas-connections leading from the region externally of said metallic tank structure to the two-break rotatable-contact-arm type of arc-extinguishing assemblage.

6. The combination according to claim 5, wherein a second two-break rotatable-contact-arm type of arc-extinguishing assemblage is disposed above the first said rotatable-two-break contact-arm type of arc-extinguishing assemblage, thereby constituting at least a four-break circuit-interrupting device, and common insulating operating-rod means are utilized to effect simultaneous operation of the two rotatable arc-extinguishing assemblages.

7. The combination according to claim 3, wherein the line-connection (37) of one current-transformer casing is disposed at an upper level, whereas the other line-connector (38) for the other current-transformer metallic casing is disposed at a lower horizontal level.

8. A high-voltage, high-power compressed-gas circuit-interrupter including a pair of vertically-spaced two-break rotatable-contact-arm type of arc-extinguishing assemblages spaced vertically one above the other, the axes of rotation of said two arc-extinguishing assemblages being generally horizontal, grounded metallic tank means for enclosing said two arc-extinguishing assemblages, common operating-rod means for effecting simultaneous rotation of the two rotatable contact-arm types of arc-extinguishing assemblages, and a pair of terminal-bushing structures disposed diametrically on opposite sides of said metallic tank structure for carrying the line-current to said two arc-extinguishing assemblages on opposites sides of said metallic tank structure.

9. The combination according to claim 8, wherein generally-horizontally-arranged metallic conduit-structures are interposed between the main metallic tank structure and each terminal-bushing metallic casing, and current-transformer means encircles at least one of said horizontally-extending metallic conduit structures.

* * * * *